US006340517B1

(12) United States Patent
Propst, Jr.

(10) Patent No.: US 6,340,517 B1
(45) Date of Patent: Jan. 22, 2002

(54) SECURITY LOTTERY TICKET STOCK

(75) Inventor: Charles W. Propst, Jr., Gettysburg, PA (US)

(73) Assignee: SKC Acquisition Corporation, Gettysburg, PA (US)

( * ) Notice: Subject to any disclaimer, the term of this patent is extended or adjusted under 35 U.S.C. 154(b) by 0 days.

(21) Appl. No.: 09/446,977

(22) PCT Filed: Jul. 1, 1998

(86) PCT No.: PCT/US98/13697

§ 371 Date: Feb. 29, 2000

§ 102(e) Date: Feb. 29, 2000

(87) PCT Pub. No.: WO99/01294

PCT Pub. Date: Jan. 14, 1999

Related U.S. Application Data

(60) Provisional application No. 60/051,565, filed on Jul. 2, 1997.

(51) Int. Cl.[7] .............................. B32B 3/00; B42D 3/00

(52) U.S. Cl. ........................... 428/195; 283/93; 283/94; 283/102; 283/903; 283/114; 283/901; 428/182

(58) Field of Search ................................ 428/195, 182; 162/134; 283/93, 94, 102, 114

(56) References Cited

U.S. PATENT DOCUMENTS

| | | | | | |
|---|---|---|---|---|---|
| 4,174,857 | A | * | 11/1979 | Koza | 283/6 |
| 4,191,376 | A | * | 3/1980 | Goldman et al. | 273/139 |
| 4,398,708 | A | * | 8/1983 | Goldman et al. | 270/18 |
| 4,850,618 | A | * | 7/1989 | Halladay, Jr. | 283/94 |
| 5,061,345 | A | * | 10/1991 | Hoffman | 162/125 |
| 5,542,710 | A | * | 8/1996 | Silverschotz et al. | 283/94 |
| 5,603,996 | A | * | 2/1997 | Overcash et al. | 428/34.2 |
| 5,681,065 | A | * | 10/1997 | Rue, Jr. et al. | 283/903 |
| 5,840,405 | A | * | 11/1998 | Shusta et al. | 428/156 |
| 5,853,864 | A | * | 12/1998 | Bunnelle | 428/261 |

* cited by examiner

*Primary Examiner*—Cynthia H. Kelly
*Assistant Examiner*—Kimberly T. Nguyen
(74) *Attorney, Agent, or Firm*—Stevens, Davis, Miller & Mosher, L.LP.

(57) ABSTRACT

A security stock material for use in lottery tickets or other instruments where prevention of the viewing of indicia on the lottery ticket is achieved despite tampering to make the stock material translucent by chemical or other means. A method of making the stock material by combining natural brown kraft linerboard with bleached fibers on one side and a black ink or black coating on the other side is also disclosed.

22 Claims, No Drawings

SECURITY LOTTERY TICKET STOCK

CROSS REFERENCE TO RELATED APPLICATIONS

This is a national stage application, under 35 USC § 371 of PCT/US98/13697, filed Jul. 1, 1998, and additionally claims priority from U.S. Provisional Application No. 60/051,565, filed Jul. 2, 1997, under 35 USC § 119(e)(1), both of which are hereby incorporated by reference.

BACKGROUND OF THE INVENTION

1. Field of the Invention

The invention relates to a method of creating a security lottery ticket stock and a novel stock material which finds use as a security stock for lottery tickets and other valuable instruments.

2. Background of the Invention

Standard security lottery ticket stock consumes base stock made of solid bleached sulfate white board or vat dyed black fibers, which is black fiber board. Either of these systems include very expensive material. The use of vat dyed board can cost $2,000 per U.S. ton; the more economical system of solid bleached sulfate board is $800 per U.S. ton. Either system has been proven to pass a generally defined security test to protect the security of the indicia indicating a winning or losing ticket. This test includes the use of chemicals, such as those known by the trademarks FANTASTIC, WINDEX, and generic isopropyl alcohol. Any of the above chemicals can be used to saturate the finished lottery stock printed with indicia, and numbers or other indicia covered with an opaque type covering that needs to be scratched off to read the numbers, letters, or other indicia that identify the ticket as a winning or losing purchase. This can be visualized because unacceptable lottery ticket stock will reveal the winners without the need to scratch the covering, because the base material becomes translucent and can be read when held near a light source of a very high wattage. The wattage tested can be as high as 500 watts. The high wattage test can also be completed, revealing the numbers or letters covered without saturating the ticket with any of the above chemicals, or chemicals other than those listed that may be used to cause the ticket to become translucent. To be approved as a security lottery ticket stock, it is a requirement that the dry ticket must protect number or letters when exposed to high wattage. A further requirement is designing the security lottery ticket with superior bonding between the black center, or in the case of solid bleached sulfate, between the layer of black ink or coating and the final layer of white ink or coating over the black.

On the two stocks mentioned in this patent application, the stock other than solid bleached sulfate is vat dyed fiber board. Utilizing vat dyed black fiber board releases the process of the necessary printing or coating of black ink or coating on the solid bleached sulfate stock. The fiberous black dyed board will usually allow for excellent bond between the black base and the white, but requires an excellent heavy coat weight of opaque white to both sides to allow both sides of the ticket to appear to be white and opaque and also be receptive to printing of instructions and rules and also the preprinting of letters and/or numbers to the opposite side to be covered with an opaque wax type material for protection of the winning or losing number and/or letter combinations.

It is important that all security lottery tickets have excellent bond between the black fiber ply, black ink or black coating and the opaque white overprint, so that as removing the opaque wax covering of the winning or losing combination of numbers and/or letters does not cause removal of the numbers and/or letters from the security lottery ticket, causing the ticket to become invalid or allowing for a fraudulent attempt to alter a losing ticket. In reality, the possibility of this number removal can and does happen, but it is important to keep such occurrences to a minimum. This minimum is measured through the process of testing stock and passing or not passing lottery ticket stock based on the previously listed and not listed tests for adhesion or bond, as determined by each lottery ticket producer.

DETAILED DESCRIPTION OF THE PREFERRED EMBODIMENTS

The disclosure revealed in this patent application improves the security system in all four or more categories of the above mentioned paragraphs. First, the use of natural brown kraft fiber liner board, typically used for corrugated containers, is used in the invention. This type of board is normally less expensive. Brown kraft laminated at the paper mill with bleached kraft fibers to create a board with one white side is presently $600 per U.S. ton.

Secondly, by utilizing a linerboard consisting of one ply of natural brown kraft and one or more plys (one ply or a plurality of white fibers being preferred) of bleached white kraft, generating a brightness number of 76 or higher, requires one only to apply black ink or black coating, then a topcoat of white ink or white coating necessary to develop a brightness of 76 or higher to the kraft side. Applying the black ink or black coating to the kraft side creates a superior bond because natural brown kraft fibers are less smooth, which allows for areas of bonding compared to the smooth solid bleached sulfate or the smooth vat dyed black ticket board stock. Superior bond of the natural brown kraft fibers to the black ink or black coating allows for excellent test results when exposed to saturation of the aforementioned chemicals and the aforementioned high wattage light source. Thirdly, with the slightly rougher natural brown fiber surface giving good bond to the black ink or coating, this in turn allows for superior bond between the black ink or black coating with the top coating of opaque white ink or white coating, which in turn becomes the ticket of choice for cost and security performance. Less claims of winning number and/or letters being scraped away with the opaque wax covering of the winning or losing numbers and/or letters, thus allowing less than the expected minimums of attempts to fraudulently make losing tickets into winning tickets.

A secondary, but more expensive embodiment, is the use of total natural brown kraft liner that is natural brown throughout which would require one side to be coated with black ink or black coating and secondly with a topcoat of white ink or white coating, and the opposing side to be applied with opaque white ink or white coating only, giving the identical appearance of a total white ticket.

Additional embodiments of the invention include:

(a) Variations in the Black ink or black coating;

(b) Variations in the opaque white ink or white coating.

Firstly, variations in process of the black ink or black coating can include the use of a print plate in a confused design. This may be the use of Chinese characters, the alphabet, random pattern, nondescript lines or other visual noise as part of the process to create a more difficult reading of tickets in security testing. Secondly, this pattern with or without the use of a solid black ink or black coating in conjunction with the aforementioned confused print design can also improve security of the lottery ticket. The application of one or more layers of solid black ink or black coating may be used or not used in conjunction with a confused print design.

Thirdly, the use of one or more coatings of opaque white ink or white coating can be used with any of the aforementioned combinations of black ink or black coating mentioned in additional embodiments (a). This creates multiples of combinations of an economic, aggressively secure lottery ticket stock.

As used herein, the terms "white coating" and/or "black coating" includes a polymeric or resinous vehicle containing filler and/or pigment, dyes, and other compounds which would impart the desired "white" or "black" colors to the coating.

The invention can be evaluated vis-a-vis prior art stock material (Sample 1) in the following example in which Samples 2 and 3 are representative of the invention.

EXAMPLE

Various stock materials were used to make lottery tickets and the tickets tampered with to determine the security of the indicia thereon determining winning and losing tickets.

TABLE 1

Sample raw date from the security evaluation analysis

| TICKET TYPE | TICKET NUMBER | TEST PERFORMED | TEST RESULT |
|---|---|---|---|
| Sample 1 | 1 | Oven/Humidity | PASS |
| Sample 1 | 2 | Alcohol/Alkali | FAIL |
| Sample 1 | 3 | Alcohol/Alkali | FAIL |
| Sample 1 | 6 | Methanol | PASS |
| Sample 1 | 4 | Ethanol | PASS |
| Sample 1 | 8 | Acetone | PASS |
| Sample 2 | 1 | Oven/Humidity | PASS |
| Sample 2 | 2 | Alcohol/Alkali | PASS |
| Sample 2 | 4 | Alcohol/Alkali | PASS |
| Sample 2 | 3 | Alcohol/Alkali | PASS |
| Sample 2 | 5 | Methanol | PASS |
| Sample 2 | 6 | Ethanol | PASS |
| Sample 2 | 7 | Acetone | PASS |
| Sample 3 | 1 | Oven/Humidity | PASS |
| Sample 3 | 2 | Alcohol/Alkali | FAIL |
| Sample 3 | 4 | Methanol | PASS |
| Sample 3 | 3 | Ethanol | PASS |
| Sample 3 | 5 | Acetone | PASS |

Although the invention has been described with reference to certain preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims.

I claim:

1. A security stock material comprising a natural brown kraft linerboard, said linerboard comprising one ply of natural brown kraft having on one side thereof at least one ply of bleached white kraft, and on the other side thereof, a black coating or black ink applied to the natural brown kraft ply and a top coating of opaque white ink or white coating.

2. The stock material of claim 1, wherein the black ink or black coating is applied so as to cause visual noise.

3. The stock material of claim 1, wherein the black ink or black coating is applied in the form of printed Chinese characters, alphabet, random pattern or non-descript line.

4. The stock material of claim 1, containing only one ply of bleached white kraft.

5. The stock material of claim 2 further containing at least one layer of solid black ink or black coating.

6. The stock material of claim 3 further containing at least one layer of solid black ink or black coating.

7. The stock material of claim 2 additionally containing an opaque white ink or white coating disposed on the black ink or black coating on the side opposite of said top coating of opaque white ink or white coating.

8. The stock material of claim 3 additionally containing an opaque white ink or white disposed on the black ink or black coating on the side opposite of said top coating of opaque white ink or white coating.

9. The stock material of claim 2, further comprising an opaque white overprint bound to said black coating or black ink.

10. The stock material of claim 3, further comprising an opaque white overprint bound to said black coating or black ink.

11. A lottery ticket comprising the stock material of claim 1, further including indicia to indicate a winning or losing ticket.

12. The lottery ticket of claim 11 further comprising a scratch off coating over said indicia.

13. The stock material of claim 1, wherein said bleached white kraft has a brightness number of at least 76.

14. The stock material of claim 1, wherein said top coating has a brightness number of at least 76.

15. A security stock material comprising:

a kraft liner having a first side and a second side;

a black ink or coating disposed on said first side of said liner;

a white ink or white coating disposed on said black ink or black coating; and an opaque white ink or white coating, situated on said second side of said liner.

16. The security stock material of claim 15, wherein said white ink or white coating disposed on said black ink or black coating and said opaque white ink or white coating, situated on said second side of said liner, completely cover said stock material, such that said stock material is white in appearance.

17. A method for making security lottery ticket stock, said method comprising the steps of providing a natural brown kraft linerboard having on one side thereof white bleached kraft fibers generating a brightness number of at least 76, forming on the other side thereof a black ink or black coating and forming a top layer of opaque white ink or white coating over the black ink or coating.

18. The method of claim 17, wherein said black ink or black coating is applied as a solid layer.

19. The method of claim 18 further comprising applying a visual noise layer in contact with said black ink or black coating.

20. The method of claim 18 further including applying a visual noise layer comprising a white ink or white coating.

21. The method of claim 17 wherein said top layer of opaque white ink or white coating generates a brightness number of at least 76.

22. The method of claim 19 further comprising applying a visual noise layer comprising a white ink or white coating.

* * * * *